(No Model.)
W. W. LEE.
MAKING HOLLOW HANDLED IMPLEMENTS.
No. 363,401. Patented May 24, 1887.
Fig. 1.
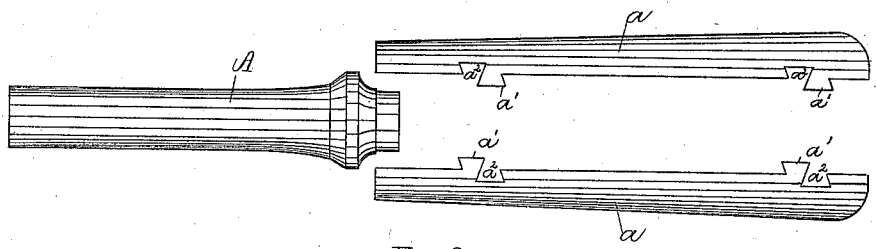
Fig. 2.
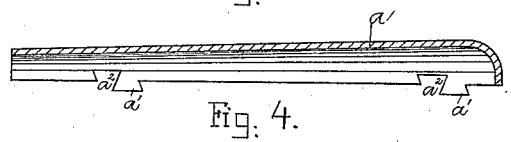
Fig. 4.
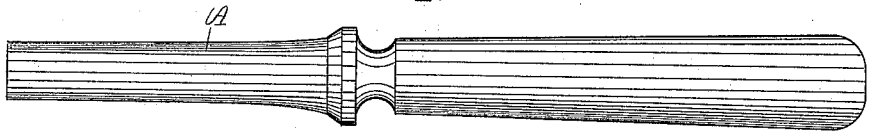
Fig. 3.
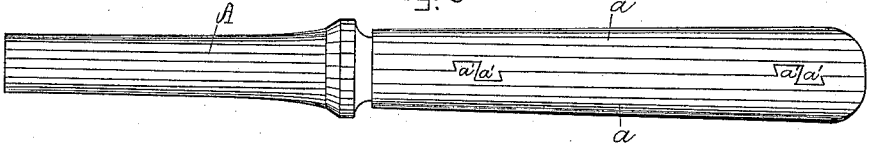
Fig. 5.
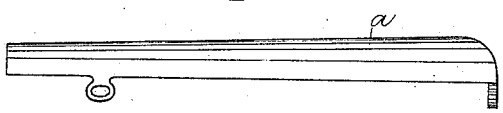
Fig. 6.
Witnesses.
L. W. Möller
John R. Snow
Inventor.
William W. Lee,
by his attorney,
J. E. Maynadier

UNITED STATES PATENT OFFICE.

WILLIAM W. LEE, OF NORTHAMPTON, MASSACHUSETTS.

MAKING HOLLOW-HANDLED IMPLEMENTS.

SPECIFICATION forming part of Letters Patent No. 363,401, dated May 24, 1887.

Application filed July 31, 1886. Serial No. 209,650. (No model.)

*To all whom it may concern:*

Be it known that I, WILLIAM W. LEE, of Northampton, in the county of Hampshire and State of Massachusetts, have invented a new and useful Improvement in Hollow-Handle Implements, of which the following is a specification, reference being had to the accompanying drawings, in which—

Figure 1 shows a stub-piece adapted to form a knife-blade, fork, saw, chisel, or other implement, and also shells adapted to form a handle for the stub-piece. Fig. 2 is a longitudinal section of a shell, and Fig. 3 shows the stub-piece and shells after they are united together. Fig. 4 shows the stub-piece and shells after they are drop-forged and ground, and Figs. 5 and 6 show shells with a modified form of holding portions.

Hitherto much difficulty has been encountered in the making of implements having hollow metallic handles, owing to the imperfect uniting of the various parts and consequent unsightliness, and also to the liability of the imperfectly-made handles to leak when in the plating solution; and the main object of my invention is to overcome these difficulties by securing a better uniting of the parts of the implement than has been obtained heretofore, so that the seams and joints are not only unnoticeable, but also tight, and thereby obviate danger of leakage when in the plating solution; but, aside from these advantages, my invention possesses the important advantage of being cheaply and readily constructed, as will be clear to all persons skilled in the art.

In the drawings, A is a stub-piece, adapted to be drawn out into, say, a knife-blade or fork; and $a$ $a$ are shells, preferably of soft sheet-steel, which are struck up, substantially as shown, nearly in the form of sections of a handle for the stub-piece.

In order to readily handle the stub-pieces and shells, I make the shells with the dovetail projections $a'$ and notches $a^2$ on their edges, or in some equivalent way.

In Fig. 5 a shell is shown with eyes on its edge, and in Fig. 6 a companion shell is shown with lugs to fit these eyes, both eyes and lugs being turned inwardly when shells $a$ are united together, as will be plain to all skilled in the art. After the shells are secured together and to the stub-piece, I first raise the stub-piece and shells to a welding-heat and weld the shells to the stub-piece and to each other, and give the desired shape under a drop-forge in a well-known way. In this way the shells and stub-piece are satisfactorily united and the handle is made practically seamless.

What I claim as my invention is—

The improvement in the art of making hollow-handled implements above described, consisting in striking up the shells $a$ $a$, one shell having projections $a'$ and the other cavities $a^2$, then securing them together and to the stub-piece A, and welding between dies, all substantially as described.

WILLIAM W. LEE.

Witnesses:
 C. H. PIERCE,
 W. M. COCHRAN.